United States Patent
Meijer

(10) Patent No.: US 8,499,576 B2
(45) Date of Patent: Aug. 6, 2013

(54) DEWPOINT COOLING DEVICE

(75) Inventor: Willem Meijer, Zelhem (NL)

(73) Assignee: Optimair BV IO, Tuk (NL)

( * ) Notice: Subject to any disclaimer, the term of this patent is extended or adjusted under 35 U.S.C. 154(b) by 788 days.

(21) Appl. No.: 12/095,063

(22) PCT Filed: Nov. 28, 2006

(86) PCT No.: PCT/NL2006/000595
§ 371 (c)(1),
(2), (4) Date: Sep. 3, 2008

(87) PCT Pub. No.: WO2007/061298
PCT Pub. Date: May 31, 2007

(65) Prior Publication Data
US 2009/0223241 A1    Sep. 10, 2009

(30) Foreign Application Priority Data
Nov. 28, 2005 (NL) ..................................... 1030538

(51) Int. Cl.
*F28D 5/00* (2006.01)
*F28D 5/02* (2006.01)
*F28C 1/00* (2006.01)

(52) U.S. Cl.
USPC ................................ 62/314; 62/121; 62/259.4

(58) Field of Classification Search
USPC .................................. 62/314, 121, 259.4, 304
See application file for complete search history.

(56) References Cited

U.S. PATENT DOCUMENTS

| 4,002,040 | A | * | 1/1977 | Munters et al. ................. 62/121 |
| 4,708,832 | A | | 11/1987 | Norback | |
| 4,830,101 | A | * | 5/1989 | Ohara et al. ................... 165/133 |
| 4,976,113 | A | * | 12/1990 | Gershuni et al. ................ 62/314 |
| 6,050,100 | A | * | 4/2000 | Belding et al. ................. 62/271 |
| 6,063,972 | A | * | 5/2000 | Duncum et al. ................ 585/15 |
| 6,338,258 | B1 | * | 1/2002 | Lee et al. ....................... 62/310 |
| 6,497,107 | B2 | | 12/2002 | Maisotsenko et al. | |
| 7,264,649 | B1 | * | 9/2007 | Johnson et al. ................... 95/10 |
| 2002/0073718 | A1 | * | 6/2002 | Maisotsenko et al. .......... 62/121 |
| 2003/0033826 | A1 | * | 2/2003 | Moriguchi et al. .............. 62/315 |
| 2003/0145609 | A1 | * | 8/2003 | Maisotsenko et al. .......... 62/121 |
| 2005/0210907 | A1 | * | 9/2005 | Gillan et al. .................... 62/304 |
| 2006/0000227 | A1 | * | 1/2006 | Hyland et al. .................. 62/236 |
| 2008/0093059 | A1 | * | 4/2008 | Nishida ......................... 165/133 |
| 2009/0314160 | A1 | * | 12/2009 | Meijer .......................... 95/148 |

FOREIGN PATENT DOCUMENTS

| CA | 2497259 | 11/2003 |
| GB | 2351345 | 12/2000 |
| WO | PCT/BE98/00121 | 8/1999 |
| WO | WO 2007/026023 | 3/2007 |

* cited by examiner

*Primary Examiner* — Ljiljana Ciric
*Assistant Examiner* — Alexis Cox
(74) *Attorney, Agent, or Firm* — Clark A. Puntigam; Jensen & Puntigam, P.S.

(57) ABSTRACT

Airflow cooling device including a cooling channel, an evaporating channel separated from the cooling channel by a transfer wall, outflow from the cooling channel going to the evaporating channel, and a lower critical solution temperature polymer at least partially covering the cooling channel side of the transfer wall.

6 Claims, 3 Drawing Sheets

DEWPOINT COOLING DEVICE

TECHNICAL FIELD

The invention relates to a device for cooling an airflow, comprising at least one cooling channel with an inflow opening for the airflow for cooling and an outflow opening for the cooled airflow, at least one evaporating channel separated from the cooling channel by a transfer wall and having an inflow opening, which is connected to the outflow opening of the cooling channel, and an outflow opening, and means for wetting the side of the transfer wall directed toward the evaporating channel. Such a device, with which an airflow can be cooled indirectly by means of evaporation and which is also referred to as "dewpoint cooler", is known from American U.S. Pat. No. 4,002,040.

BACKGROUND ART

The known cooling device takes the form of a crosscurrent heat exchanger with a number of groups of mutually parallel cooling channels and a number of groups of evaporating channels which are likewise mutually parallel and which run perpendicularly of the cooling channels. A group of cooling channels here adjoins in each case two groups of evaporating channels on either side, and vice versa, whereby as it were a layered structure of the heat exchanger is obtained.

The walls which form the partition between the cooling channels and the evaporating channels, and which thus serve for the transfer of heat (or cold) therebetween, are manufactured from a material which conducts heat very well, such as for instance aluminum. The walls of the evaporating channels, also including the walls forming the partition between the evaporating channels and the cooling channels, are all covered with a material which can retain moisture. Arranged above the evaporating channels are wetting means in the form of periodically operating sprayers which spray a quantity of water onto the walls with the moisture-retaining material.

In the known cooling device air for cooling, for instance ambient air, is drawn in by a fan and forced through the cooling channels. From the cooling channels the cooled air flows for instance to a space for ventilating. When leaving the cooling channels part of the air, for instance a third of the volume flow, is however separated from the main flow and guided to the evaporating channels. There, the cooled air flows along the moist walls, whereby moisture is evaporated and entrained in the airflow. Evaporation of the moisture results in a reduction of the temperature of the walls. Due to the good heat conduction of the transfer walls, this also results in a temperature decrease in the cooling channels, whereby the airflow is thus cooled.

Compared to for instance an air conditioning installation, this known cooling device on the basis of indirect evaporation has the advantage that cooling of the air requires only little power. This cooling device moreover has few moving parts, so that it can be manufactured and installed in simple manner and at low cost. In addition, no cold-generating agents are necessary.

Compared to direct evaporation coolers, the indirectly operating cooling device has the advantage that cooling of the air does not involve an increase of the air humidity. The supply of day cooled air results in a pleasant climate in the space cooled thereby. With such an indirectly operating cooling device the air can moreover be cooled to a lower temperature than would be possible with a direct evaporation cooler. Where the direct evaporation cooler cannot cool the air beyond the so-called "wet bulb" temperature, the indirectly operating evaporation cooler can cool the air to the so-called "dewpoint", which is the reason the known cooling device is also referred to as a dewpoint cooler.

DISCLOSURE OF THE INVENTION

The invention now has for its object to improve a cooling device of the above described type such that the supplied airflow can be cooled still further therewith, and an even more pleasant indoor climate can be realized. According to the invention this is achieved in such a cooling device by means for dehumidifying the airflow in the cooling channel. By extracting moisture from the air for cooling, this air can absorb more moisture in the evaporating channel, whereby a larger quantity of evaporation heat is extracted from the wall and the temperature thereof thus decreases further.

The dehumidifying means preferably comprise a polymer with lower critical solution temperature (LCST polymer). Such a polymer is water-soluble up to the critical temperature and in this way retains moisture. The stability of the polymer in dissolved state is guaranteed here by suitably chosen crosslinking means.

A simple embodiment of the cooling device according to the invention is obtained when the side of the partition wall directed toward the cooling channel is at least partly covered with or is manufactured from an LCST polymer. The inflow side of the or each cooling channel could thus for instance be covered with a strip of LCST polymer. It is of course also possible to envisage all walls of the or each cooling channel being wholly covered with this material.

The LCST polymer can advantageously be chosen from the group comprising polyoxazoline, poly(dimethylamino ethyl methacrylate) (p(DMAEMa) and poly(N-isopropylacrylamide) (pNiPAAm). These are all polymers which can extract from the air and retain a relatively large quantity of moisture.

The cooling device according to the invention is preferably further provided with means for regenerating the dehumidifying means. The effectiveness of these dehumidifying means will after all decrease as they extract more moisture from the inflowing air and thus become saturated. This moisture can be released from the dehumidifying means by then activating the regenerating means, whereby the original effectiveness is restored.

In a structurally and operationally simple embodiment of the cooling device the regenerating means are adapted to periodically heat the LCST polymer above the critical solution temperature. Since such a polymer is characterized by its low critical solution temperature, usually in the order of 60 to 70° C., simple heating elements can suffice.

In order to prevent the regeneration resulting in moistening of the airflow for cooling, the regenerating means are preferably adapted to collect and discharge from the cooling channel moisture relinquished by the LCST polymer during regeneration.

A particularly efficient cooling device is then obtained when the regenerating means are adapted to guide the collected moisture to the wetting means. Only little water need thus be supplied for the purpose of wetting the evaporating channels.

The invention is now elucidated on the basis of two embodiments, wherein reference is made to the accompanying drawing, in which:

BEST MODE FOR CARRYING OUT THE INVENTION

Figure 1:
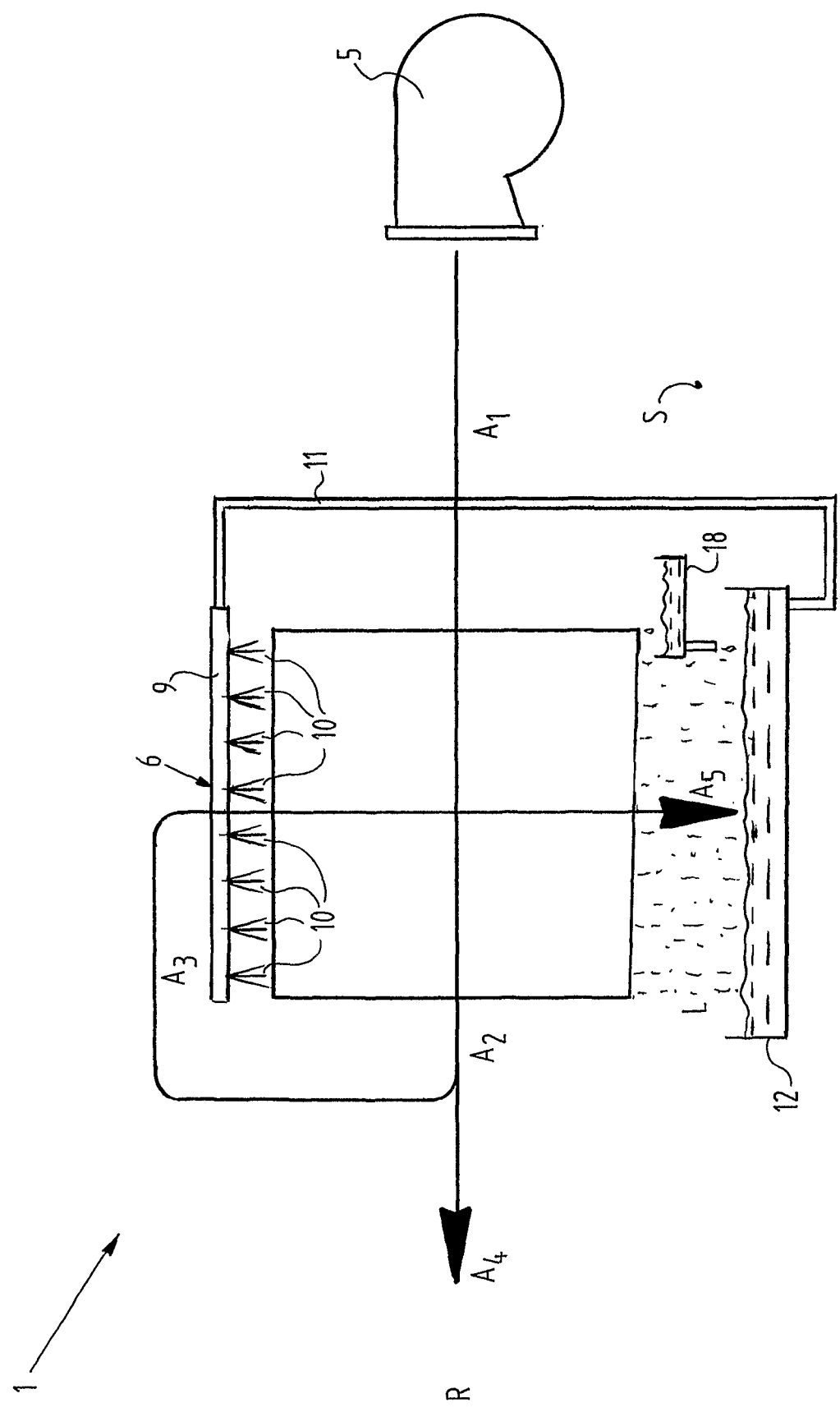
FIG. 1 shows a schematic view of the airflow through a cooling device according to the invention which operates in cross-current.
Figure 2:
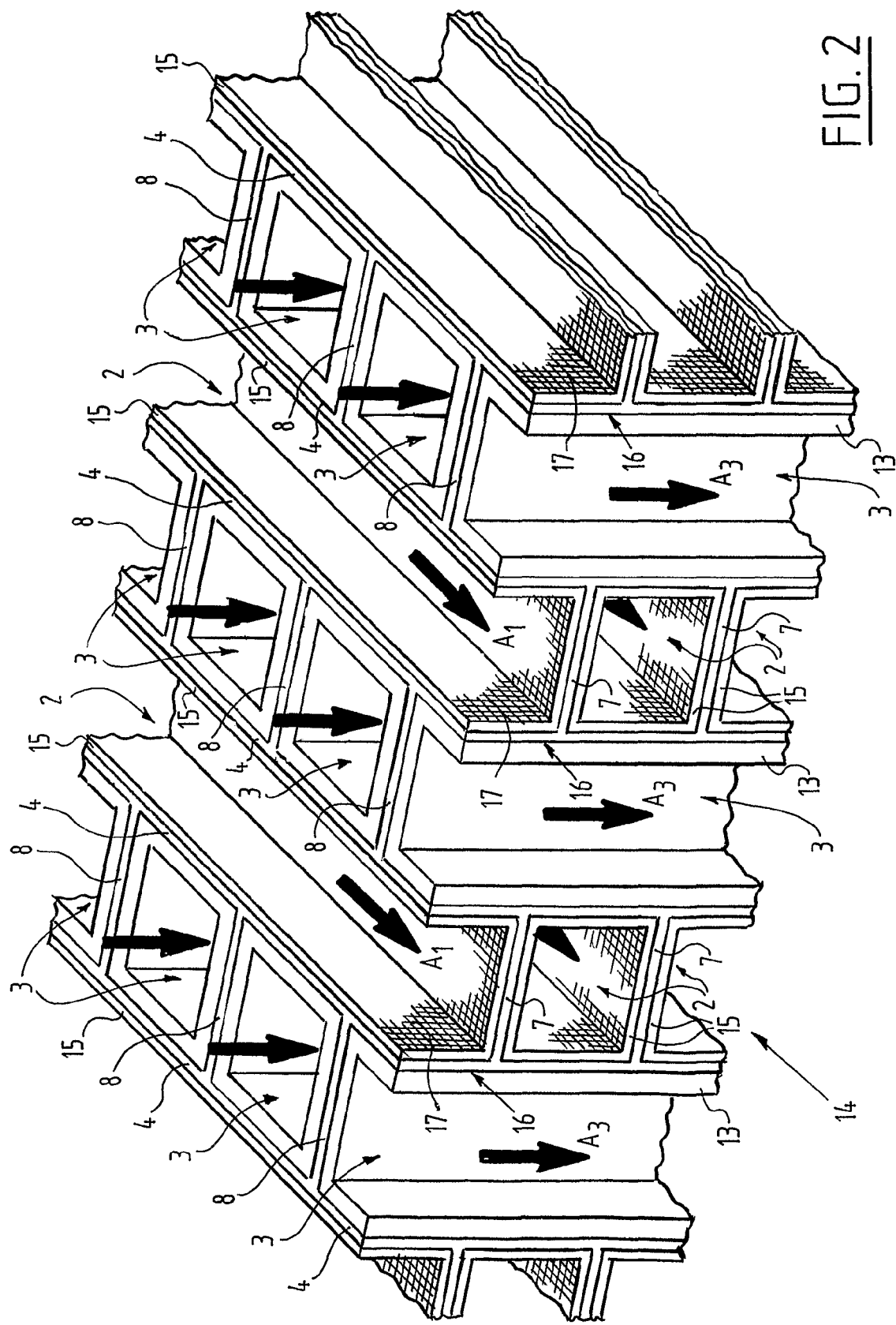
FIG. 2 is a perspective detail view of a part of the cooling channels and evaporating channels of the cooling device of FIG. 1.

A device 1 (FIG. 1) for cooling an airflow comprises a number of groups of mutually parallel cooling channels 2 separated by partition walls 7 (FIG. 2), with an inflow opening for the airflow $A_1$ for cooling and an outflow opening for the cooled airflow $A_2$. The inflow openings are for instance connected to the outside environment S, while the outflow openings debouch into a space for cooling R. The airflow through cooling device 1 is provided by a fan 5.

Cooling device 1 further comprises a number of groups of evaporating channels 3 separated from cooling channels 2 by transfer walls 4. Evaporating channels 3 are mutually separated by partition walls 8. The inflow openings of evaporating channels 3 are connected to the outflow openings of cooling channels 2, while the outflow openings of cooling channels 3 debouch into the outside environment S.

Due to the connection between cooling channels 2 and evaporating channels 3 a partial flow $A_3$ is separated from cooled airflow $A_2$ and guided through evaporating channels 3. After passing through the evaporating channels, the then moist airflow $A_5$ is blown out into the outside environment S. The ratio between main flow $A_4$, which is eventually guided to the space for cooling R, and the separated partial flow $A_3$ is determined by, among other factors, the dimensions of the cooling channels and the evaporating channels, and can for instance amount to 2:1.

Cooling device 1 is further provided with means 6 for wetting evaporating channels 3 and in particular transfer walls 4. These wetting means 6 here comprise a spray pipe 9 with a number of openings 10 and a feed conduit 11 through which water is carried from a collecting vessel 12 below evaporating channels 3 to spray pipe 9 using a pump (not shown here). In order to prevent wetting means 6 having to operate continuously the walls 4, 8 of evaporating channels 3 are covered with a material 13 which retains the moisture, for instance an absorbent fabric or a coating of ceramic metal.

Thus far the cooling device 1 is still largely of conventional structure. In order to increase the efficiency of the cooling device, and thereby achieve a further cooling of the incoming airflow $A_1$ than is possible with conventional cooling devices, the invention proposes to dehumidify this incoming airflow $A_1$. The capacity of the separated airflow $A_3$ to absorb moisture hereby increases, so that more moisture can be evaporated in evaporating channels 3 and a greater quantity of evaporation heat can thus be extracted from transfer walls 4. In this way the transfer walls 4 become colder than in conventional cooling devices, so that a higher cooling capacity is achieved.

In the shown embodiment the means 14 for dehumidifying the airflow $A_1$ to be cooled take the form of a polymer material with a lower critical solution temperature (LCST polymer), which is arranged as covering layer 15 on walls 4, 7 of cooling channels 2. As LCST polymer it is possible here to envisage a material such as polyoxazoline, poly(dimethylamino ethyl methacrylate) (p(DMAEMa) and poly(N-isopropylacrylamide) (pNiPAAm). Although all walls 4, 7 of cooling channels 2 are here fully covered with the LCST polymer, it is also possible to envisage sufficing with covering only a part of the walls, for instance the vertical transfer walls 4. It is also possible to envisage the LCST polymer being arranged over only a part of the length of cooling channels 2, for instance on the inflow side thereof (FIG. 3), or even in an inflow part of cooling device 1 located upstream of the actual cooling channels 2.

The LCST polymer layer 15 on walls 4, 7 absorbs moisture from the air flowing by and herein goes into solution. The dissolved polymer layer 15 retains its stability due to the presence of suitably chosen cross linkers. As stated, the moisture absorption capacity of airflow $A_3$ in evaporating channels 3—and therewith the cooling capacity—increases due to dehumidifying of the air. In addition, this results in a higher degree of comfort since the cooled airflow $A_2$ supplied to space R is drier.

As more moisture is absorbed into the LCST polymer layer 15 and this layer thus becomes further saturated, the effectiveness of dehumidifying means 14 decreases. In the shown embodiment the cooling device 1 is therefore also provided with means 16 for regenerating polymer layer 15. These regenerating means 16 are adapted to periodically heat the LCST polymer above its critical solution temperature. Because this critical temperature is relatively low, and amounts for instance to in the order of 60 to 70° C., relatively simple, it is possible to suffice with low-power heating elements 17. The construction and operation of such heating elements is described and shown in the non pre-published Netherlands patent application 1030149 of applicant.

When the LCST polymer 15 is heated above its critical solution temperature, it comes out of solution and the moisture L is thus released once again. This moisture L then flows along walls 4, 7. In order to prevent undesired moistening of inflowing air $A_1$ as a result regenerating means 16 are further adapted to collect, discharge from cooling channels 2, this moisture L relinquished during regeneration. For this purpose cooling channels 2 can for instance be inclined downward to some extent so that moisture L flows to the lowest point of cooling channels 2. Situated there in the shown embodiment is a collecting container 18. This latter is in turn connected to collecting container 12 of wetting means 6. The water consumption of cooling device 1 is reduced by thus guiding to the wetting means the moisture L extracted from the inflowing air.

Figure 4:
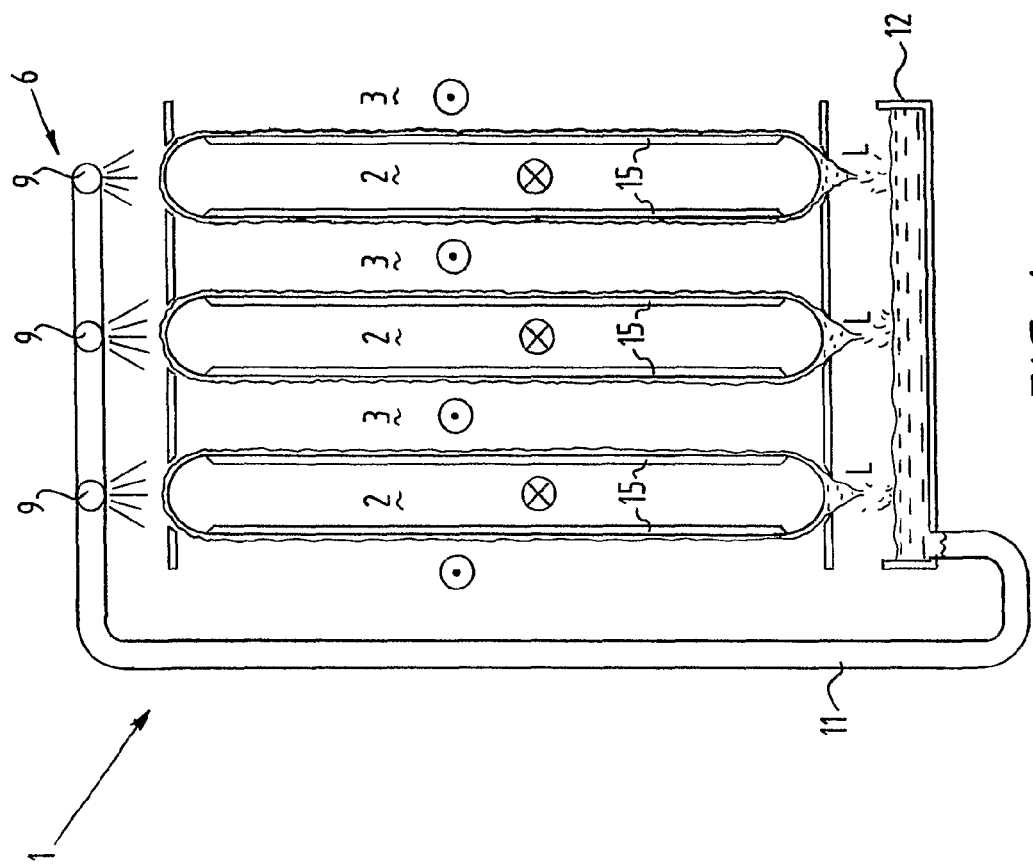
FIG. 4 is a cross-section along the line IV-IV in FIG. 3.
Figure 3:
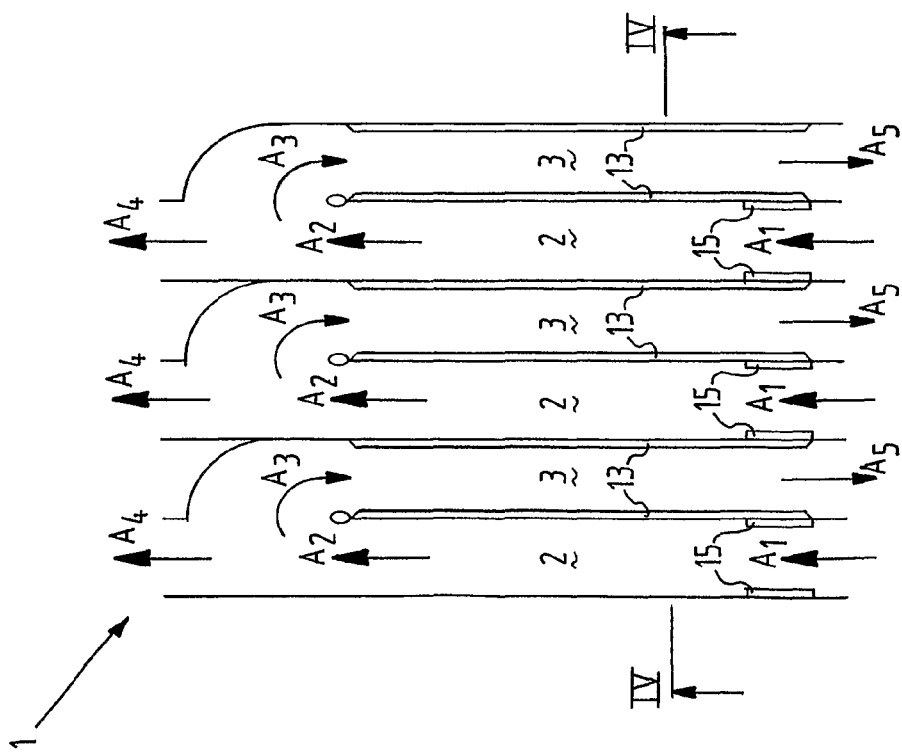
FIG. 3 is a sectional top view of an alternative embodiment of the cooling device.

Instead of crossing each other, cooling channels 2 and evaporating channels 3 can also run parallel but run in opposite directions (FIGS. 3 and 4). This is then a counterflow cooler. This set-up has the advantage that more prolonged, so more intensive heat-exchanging contact is possible between the airflow $A_1$ to be cooled and the evaporation flow $A_3$.

Although the invention is elucidated above on the basis of a number of embodiments, it will be apparent that it can be varied in many ways. The scope of the invention is therefore defined solely by the following claims.

The invention claimed is:

1. A device for cooling airflow, comprising:
    at least one cooling channel having an inflow opening and an outflow opening;
    at least one evaporating channel separated from the cooling channel by a transfer wall, said evaporating channel having an inflow opening connected to the outflow opening of the cooling channel, and the evaporating channel has an outflow opening; and
    wherein the transfer wall is at least partially covered with a lower critical solution temperature polymer on the side of the transfer wall directed toward the cooling channel.

2. The device for cooling as claimed in claim 1, characterized by means for regenerating the dehumidifying means.

3. The device for cooling as claimed in claim 2, characterized in that the regenerating means are adapted to periodically heat the LCST polymer above the critical solution temperature.

4. The device for cooling as claimed in claim 1 characterized in that the LCST polymer is chosen from the group comprising polyoxazoline, poly(dimethyl amino ethyl methacrylate) (p(DMAEMa) and poly(N-isopropylacrylamide) (pNiPAAm).

5. The device for cooling as claimed in claim 2, characterized in that the regenerating means are adapted to collect and discharge from the cooling channel moisture relinquished by the LCST polymer during regeneration.

6. The device for cooling as claimed in claim 5, characterized in that the regenerating means are adapted to guide the collected moisture to the wetting means.

\* \* \* \* \*